United States Patent
Jorn

(10) Patent No.: US 8,522,416 B2
(45) Date of Patent: Sep. 3, 2013

(54) METHOD FOR TOLERANCE COMPENSATION BETWEEN TWO FIBRE COMPOSITE COMPONENTS

(75) Inventor: Paul Jorn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 343 days.

(21) Appl. No.: 12/735,974

(22) PCT Filed: Feb. 4, 2009

(86) PCT No.: PCT/EP2009/051229
§ 371 (c)(1),
(2), (4) Date: Nov. 29, 2010

(87) PCT Pub. No.: WO2009/109441
PCT Pub. Date: Sep. 11, 2009

(65) Prior Publication Data
US 2011/0107578 A1    May 12, 2011

Related U.S. Application Data

(60) Provisional application No. 61/032,433, filed on Feb. 29, 2008.

(30) Foreign Application Priority Data

Feb. 29, 2008    (DE) .......................... 10 2008 012 055

(51) Int. Cl.
*B23Q 17/00*    (2006.01)

(52) U.S. Cl.
USPC ....... 29/407.04; 29/419.1; 264/40.1; 264/220

(58) Field of Classification Search
USPC ................. 29/419.1, 402.09, 402.11, 407.04,
29/407.05; 264/40.1, 219, 220, 257
See application file for complete search history.

(56) References Cited

U.S. PATENT DOCUMENTS

| 4,861,643 A | * | 8/1989 | Scollard | 428/162 |
| 5,033,014 A | * | 7/1991 | Carver et al. | 703/1 |

(Continued)

FOREIGN PATENT DOCUMENTS

| DE | 602 07 191 | 8/2006 |
| DE | 10 2006 041 653 | 2/2008 |
| EP | 1 081 043 | 3/2001 |

OTHER PUBLICATIONS

International Search Report for PCT/EP2009/052119, mailed Jul. 20, 2009.

(Continued)

*Primary Examiner* — David Bryant
*Assistant Examiner* — Justin Sikorski
(74) *Attorney, Agent, or Firm* — Jenkins, Wilson, Taylor & Hunt, P.A.

(57) ABSTRACT

The invention relates to a method for tolerance compensation between two fiber composite component parts (1, 3) for aircraft.

In order to compensate in simplified fashion tolerances between two fiber composite component parts being joined, the method according to the invention has the steps:

a) manufacturing the first fiber composite component part (1) wherein an assembly surface (2) can have tolerance deviations, b) manufacturing a tooling insert (7) from a surface geometry of the assembly surface (2)

c) manufacturing the second fiber composite component part (3) by means of the tooling insert (7) wherein a surface geometry of a contact surface (9) of the second fiber composite component part (3) corresponds substantially with the surface geometry of the assembly surface (2), and d) joining the first fiber composite component part (1) to the second fiber composite component part (3) in the area of the assembly surface (2) and contact surface (9).

10 Claims, 1 Drawing Sheet

(56) References Cited

U.S. PATENT DOCUMENTS

| | | | | |
|---|---|---|---|---|
| 5,261,993 | A * | 11/1993 | Dahlgren | 156/382 |
| 5,452,219 | A * | 9/1995 | Dehoff et al. | 700/163 |
| 5,725,940 | A * | 3/1998 | Sakai et al. | 428/318.6 |
| 6,849,150 | B1 * | 2/2005 | Schmidt | 156/285 |
| 7,383,094 | B2 * | 6/2008 | Kopelman et al. | 700/118 |
| 7,474,932 | B2 * | 1/2009 | Geng | 700/98 |
| 2002/0125613 | A1 | 9/2002 | Cominsky | |
| 2004/0236454 | A1 * | 11/2004 | Weisser | 700/123 |
| 2008/0256788 | A1 * | 10/2008 | Glazebrook | 29/700 |
| 2010/0209255 | A1 * | 8/2010 | Kayani et al. | 416/232 |

OTHER PUBLICATIONS

Written Opinion of the International Searching Authority for PCT/EP2009/052119, mailed Jul. 20, 2009.

* cited by examiner

Step 1
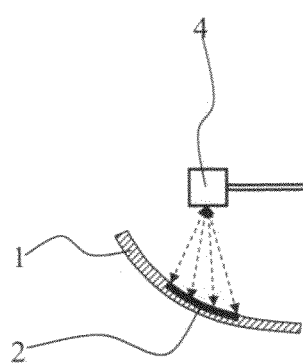
Step 2
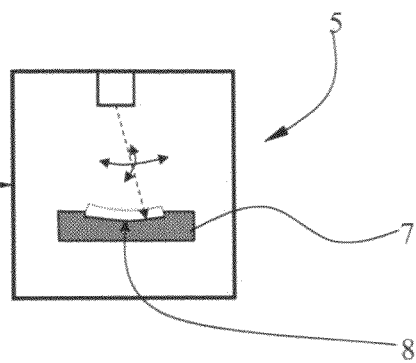
Step 4
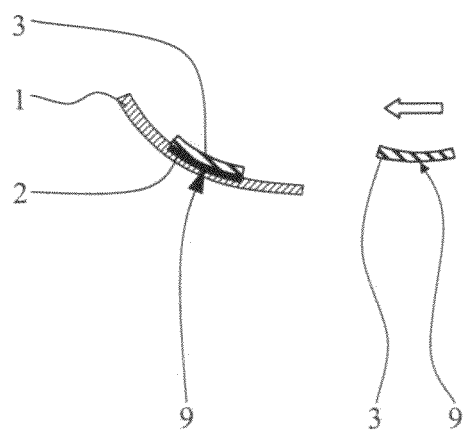
Step 3
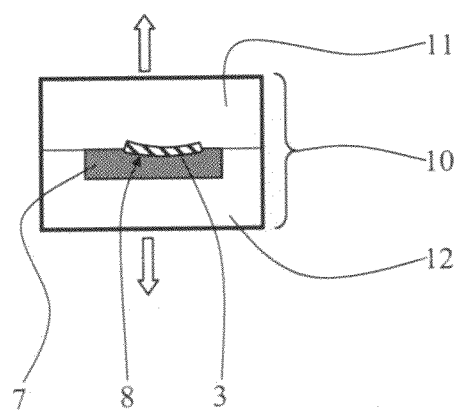

METHOD FOR TOLERANCE COMPENSATION BETWEEN TWO FIBRE COMPOSITE COMPONENTS

This application is the U.S. national phase of International Application No. PCT/EP2009/051229 filed 4 Feb. 2009, which designated the U.S. and claims priority to DE Application No. 102008012055.3 filed 29 Feb. 2008, and this application claims priority from U.S. Provisional Application No. 61/032,433 filed 29 Feb. 2008; the entire contents of each of the above applications are hereby incorporated by reference.

The invention relates to a method for tolerance compensation between two fibre composite components for aircraft.

Conventional fuselage cells for aircraft are at present mainly made with aluminium alloys. Especially to achieve weight savings the proportion of fibre composite components, more particularly carbon fibre plastics components over the entire fuselage cell structure and also other structural components is constantly being increased.

To manufacture fibre composite component parts discrete fibres or fibre bundles and/or semi-finished fibre products are combined and brought into the desired geometric mould. Reinforcement fibres can hereby already be impregnated with a matrix system (so-called prepreg material) or the fibres are impregnated in a subsequent process (infusion process or injection process) with the matrix-forming plastics material, that is the reinforcement fibres are preferably enclosed on all sides in the plastics matrix. Both processes can be carried out in closed tools or in open apparatuses. After the hardening of the matrix-forming plastics material which can be a thermosetting or thermosoftening plastics material the finished fibre composite component part is removed from the mould, mechanically re-treated where applicable and then fitted.

As a result of unavoidable manufacturing tolerances, such as for example fluctuations in the material thickness of the semi-finished fibre products, deviations in the laying and layering process as well as differing process parameters in the form of shrinkages, varying infusion and injection pressures, fluctuating impregnating temperatures, non-constant hardening temperatures and changing autoclave pressures, the hardened fibre composite material is subject to geometrical fluctuations compared with metal component parts. The tolerance interval which arises for a fibre composite component part depends essentially on the manufacturing process used, the material used as well as the geometry of the component part.

Thus for example for prepreg component parts which are moulded in simple open apparatuses, a tolerance deviation in the material thickness of up to ±10% is possible. In the case of an outer skin shell manufactured with a fibre composite material for lining a fuselage cell, with an assumed skin thickness of for example 10 mm in the region of a door cut-out the result is a fluctuation interval of up to ±1 mm as regards the material thickness.

Contrary to this, in the case of using a closed at least two-part moulding tool for carrying out the RTM method (so-called "Resin Transfer Moulding" method or resin injection method), significantly smaller tolerance intervals arise.

With this RTM method a reinforcement fibre preform blank having a suitable geometry, where applicable with the addition of further semi-finished reinforcement products, is placed in a preferably metal moulding tool and then impregnated with a plastics material, by way of example a hardenable epoxy resin. By applying a vacuum the resin injection process is then accelerated and a bubble formation in the resin matrix is avoided. Where necessary the resin can be added to the mould additionally under pressure. After the complete hardening of the fibre composite component part by using pressure and/or temperature the finished fibre composite component part can be removed from the moulding tool. The outer contour of a component part made in the RTM process or in the resin injection process is fixed with high precision and very good reproducibility through the as a rule at least two-part metal (steel) moulding tool.

In the case of open devices or tools the side of the component part facing the tool does indeed have a relatively exact surface geometry corresponding to the tool. However on the side remote from this based on the error factors previously explained considerable geometry deviations occur, that is in particular undefined thickness fluctuations. In order to overcome this problem the side of the fibre composite component part facing the tool is as a rule used as the assembly surface or also as the outer skin surface when assembling the overall structure.

This solution possibility comes up against barriers however when a small manufacturing tolerance is required on both sides of the fibre composite component parts, which is particularly the case when assembling bolted connections between several fibre composite component parts. As an example can be mentioned the assembly of carbon fibre reinforced plastics (CFP) ribs in a fuselage cell provided with a carbon fibre reinforced plastics outer skin. If by way of example a hollow cylinder on whose inside surface the composite component part is laid or constructed, is used for manufacturing the CFP outer skin then the outer skin has as a rule a sufficiently smooth surface geometry which corresponds to the inside surface of the hollow cylinder used as the mould and has a high degree of dimensional accuracy. In the area of the inside of the CFP outer skin which represents at least in some areas the assembly face for the carbon fibre reinforced plastics ribs which are to be installed, then however the unavoidable height fluctuations arise inherent in production. When installing CFP ring frames into a CFP fuselage cell of this kind tolerance deviations in the region of ±1 mm can arise between the inside surface of the CFP outer skin and the outside surface of the CFP ring frame which is generally made with a high dimensional accuracy in the RTM process. These measurement deviations give rise to an assembly gap which to guarantee a mechanically sufficiently high strength connection is filled out with a solid or fluid hardenable spacer ("shim"). The manufacturing process of the CFP ring frames and/or the CFP fuselage skin is controlled in part so that a structural minimum gap is produced in order to avoid oversizing in each case.

By installing shims, on the one hand the weight is increased and on the other the shims cause a reduced fatigue resistance in bolted connections. Furthermore the installation of the shims considerably increases the assembly costs since the gap has to be measured out and the for example paste-type shim has to be placed locally in a precisely defined layer thickness and then hardened. Finally the component part which is to be fixed is then ultimately fitted. Furthermore there are areas in the fuselage cell structure in which the use of bolted connections with shims is not permissible.

Alternatively it is by way of example possible to finish off afterwards the component part being mounted in the area of the assembly surface in order to achieve a sufficiently close-fitting precision. This can however lead to a structural weakening or uncontrollable change in the structural properties owing to the wear on the reinforcement fibre layers and/or matrix material, even if additional layers, so called sacrificial layers, are provided to make up for this material loss.

Furthermore it is conceivable to bring a component part which is to be fixed up to the installation position whilst it has still not hardened and only then to harden the component part.

The drawback with this procedure is however the low degree of automation which can be achieved and thus of the overall high processing expense since hardening in the assembly position has to take place for example inside a vacuum sack which is difficult to provide and seal at the installation site.

In the prior art a composite structure is known from DE 10 2006 041 653 A1 having a first component part of fibre composite material and a further component part of a fibre composite material with thermosoftening matrix, and a method is also known for manufacturing the composite structure wherein the second component part has a supporting area and a connecting area orientated transversely to the supporting area wherein the second component is fixed on the first component part by the connecting area and a layer of short fibre reinforced material is arranged between the connecting area and the first component part.

From DE 602 07 191 T2 it is known to produce structural arrangements with three-dimensional woven pre-formed connector members wherein during production complex structural parts with pre-formed structures are created. Adhesive is provided between the pre-formed structures and the textile preforms which have not yet been fixed. The pre-formed structures and the not yet fixed resin-impregnated three-dimensional woven textiles are then fixed jointly by means of heat and/or pressure in order to create larger complex structures.

The object of the invention is therefore to provide a simplified method for tolerance compensation between fibre composite component parts which are to be joined together.

This is achieved by a method according to the details in claim 1 with the following steps.
a) manufacturing the first fibre composite component part wherein an assembly surface has tolerance deviations,
b) manufacturing a tooling insert from a surface geometry of the assembly surface
c) manufacturing the second fibre composite component by means of the tooling insert wherein a surface geometry of a contact surface of the second fibre composite component part corresponds substantially with the surface geometry of the assembly surface, and
d) joining the first fibre composite component to the second fibre composite component in the area of the assembly surface and contact surface.

In a first method step a fibre composite component part which can be by way of example a shell segment of a CFP outer skin of an aircraft fuselage cell, is made in the conventional manner. This can take place by way of example by laying prepreg material internally on a hollow cylindrical "female" mould or a segment cut-out section thereof. After the epoxy resin matrix has hardened scanning is carried out in an intermediate step, that is an assembly surface provided for fitting for example a carbon fibre plastics ring frame, is ascertained technically by measuring.

In a second method step a tooling insert is made on the basis of the actual surface geometry data of the assembly surface determined by the measuring unit and the tooling insert is then placed in a preferably at least two-part moulding tool which serves for manufacturing the second fibre composite component part. The second fibre composite component can be for example a CFP ring frame or a segment section thereof which is made with high manufacturing precision in the at least two part closed moulding tool preferably in the RTM process. The manufacture of the tooling insert can be undertaken by way of example with any conceivable conventional machining unit, by way of example a CNC-controlled milling machine, spark erosion machine or the like. The manufacture of the tooling insert is preferably carried out however in the so-called "rapid prototyping" process in which the tooling insert is made by successive layered build-up and/or erosion of a metal alloy, a ceramic compound, plastics material or any combination thereof. As a result one side of the tooling insert corresponds to the exact actual surface geometry of the assembly surface.

In the third method step the manufacture of the second component part is carried out in known way preferably by means of a RTM process by using the tooling insert obtained in the second method step. It is hereby reached that a contact surface of the second component part in the ideal case corresponds completely with the assembly surface of the first component part (is complementary) whereby in the fourth method step a substantially gap-free joining of the assembly surface of the first component part with the contact surface of the second component part is possible for example by means of the bolted connection.

Alternatively—particularly with lesser precision demands—the manufacture of the second component part can be carried out in a simple open mould or an open tool so that the RTM method and the at least two-part closed moulding tools necessary for this are not required.

The practically gap-free connection formed with this method between the two component parts produces the optimum mechanical bearing strength at the seam. Furthermore the method can be automated to a high degree and is therefore particularly suitable for industrialised production processes.

A further development of the method proposes that the assembly surface is scanned by means of a measuring device for determining the measured data of the surface geometry of the assembly surface and is produced using the measured data of the tooling insert.

The measuring device can preferably be a contactlessly operating laser measuring system which can calculate the actual surface geometry data of the assembly surface provided for the second component part (x-y plane) with a high resolution, precision and speed over the entire surface extension. As a result a complete vertical profile of the assembly surface is determined. Alternatively measuring can also be carried out by means of a mechanical measuring device.

The measured data determined by the laser measuring system are preferably sent in real time in digital form to the adjoining finishing unit in which the manufacture of a tooling insert for a subsequent RTM manufacturing process of the second component part to be fitted is carried out on the basis of the transmitted measured data of the actual surface geometry of the assembly surface.

A further advantageous development of the method proposes that the manufacture of the tooling insert is carried out using the measured data in a modelling apparatus, more particularly a rapid prototyping apparatus, by means of a metal alloy, a ceramic compound, a plastics material or any combination thereof.

The use of the so-called rapid prototyping method enables the manufacture of the tooling insert on the basis of the measured data of the actual surface geometry of the assembly surface determined by the measuring device within the shortest time, that is in a general case in clearly less than an hour. This factor has considerable importance since for each component part which is being fixed each assembly surface has to be measured out anew in order to be able to produce a tooling insert specially adapted for this. If the component parts are by way of example CFP ring frame segments which are to be connected to a CFP fuselage cell skin then it is necessary to make each ring frame for each assembly site individually by means of the method according to the invention or to adapt it simultaneously by using an individual tooling insert for the RTM process. The tooling insert can be formed during the course of the rapid prototype method with any metal alloy, more particularly an aluminium alloy material, a sufficiently solid and temperature-resistant plastics material, a ceramic material, in some circumstances even with a hard wood or any combination thereof. The choice of material has no particular significance since each tooling insert can only be used once and this therefore need not have a long tool life.

As a result of the tooling insert which is additionally used for the RTM manufacturing process it may be necessary to modify slightly the reinforcement fibre arrangement provided as standard for the production of the second component part or the fibre preform blank used which can take place by way of example by additional reinforcement fibres and/or semi-finished fibre products.

Proceeding without adapting the fibre reinforcement arrangement is also conceivable. With the manufacture of the second component part in an open tool sufficient flexibility is provided so that the second component part can as a rule be adapted to the given assembly surface without fluctuations in the fibre volume content. If the tool is closed on the other hand (e.g. for carrying out a RTM process) then it may possibly be necessary to provide one or more flexible elements in the tool which ensure a constant fibre volume content even with a varying geometry. These flexible or elastic elements can be formed for example with the so-called Aircast® modelling or moulding mass and can have by way of example a strip-like, polygonal or circular, preferably planar shaping. Alternatively strand-like elements can also be embedded therein. Component parts or elements made with the Aircast® moulding mass have a deformation property which is comparable with elastomers such as for example rubber or silicon.

A further development of the method proposes that the manufacture of the tooling insert is carried out using a cast of the assembly surface obtained by means of a casting mass.

With this variation the use of an expensive measuring device, more particularly a laser measuring system is avoided. However using the cast in a further intermediate step a positive cast impression of the surface geometry of the assembly surface has first to be made which is then used as the tooling insert for the moulding tool used in the subsequent RTM process for manufacturing and adapting the second component part which is to be fitted. Basically any rapid hardening material which guarantees sufficient detailed precision of the cast can be used as the moulding mass.

Further advantageous developments of the method are given in the further following description of the drawing.

In the drawing:

FIG. 1 shows a schematic illustration of the procedure.

A first fibre composite component part 1 which in the illustrated embodiment is a shell or a segment of a CFP fuselage cell skin, has an assembly surface 2 for assembling a second component part 3. The second fibre composite component part is a CFP ring frame segment which is made in larger numbers in the so-called RTM process with high dimensional accuracy. Both the CFP fuselage cell skin and the CFP ring frame segment are each formed with a carbon fibre reinforcement fibre arrangement impregnated with an epoxy resin system.

In a first method step first an actual surface geometry of the assembly surface 2 is scanned by means of a measuring device 4 which is preferably a contactlessly operating high speed laser measuring system. Instead of the contactlessly operating laser measuring system it is also possible to use as an alternative a purely mechanically operating scanning system. The measured data of the actual surface geometry of the assembly surface 2 determined by the measuring device 4 are transmitted digitally and in real time by means of the data line 6 to a conventional modelling device 5, more particularly a so-called "rapid prototyping device".

In the modelling device 5 during the course of a second method step a tooling insert 7 is constructed within less than 1 hour by layered or successive erosion and/or addition of material on the basis of the measured data of the actual surface geometry of the assembly surface 2. A tooling insert surface 8 hereby has exactly the same surface geometry as the assembly surface 2 of the first fibre composite component part. The tooling insert surface 8 furthermore corresponds with high precision to a later contact surface 9 of the second fibre composite component part 3 which is produced in the subsequent RTM manufacturing process and which can be by way of example the CFP ring frame.

In a third method step the tooling insert 7 thus produced is placed in a moulding tool 10 which in the illustrated embodiment is in two parts with an upper tool 11 and a lower tool 12. After inserting a fibre preform blank with a suitable geometric shape for the second fibre composite component part there follows in the two-part moulding tool 10 the impregnation of the fibre preform blank with a hardenable plastics material, by way of example with a hardenable epoxy resin whilst simultaneously applying pressure and temperature preferably in the RTM process. Once completely hardened the second fibre composite component part 3 can be removed from the mould by removing the upper tool 11 and the lower tool 12 in the direction of the oppositely directed white arrows and releasing the tooling insert 7. As a result of the procedure previously explained the contact surface 9 of the second fibre composite component part 3 has exactly the same surface geometry as the assembly surface 2 of the first fibre composite component part 1. In a fourth and last method step the two fibre composite component parts 1, 3, or the CFP ring frame segment and the segment of the CFP fuselage cell skin respectively, are finally joined together.

The method according to the invention guarantees a gap-free connection of the two fibre composite component parts 1, 3 in the area of the assembly surface 2 or contact surface 9 respectively since in the ideal case a practically complete "positive locking engagement" is produced between the two said surfaces. A bolted connection with extremely high strength values with a simultaneously good fatigue resistance is hereby possible between the two fibre composite component parts 1, 3, which would otherwise not be attainable if the contact and assembly surfaces between two fibre composite component parts being connected were not so precision matched. Unavoidable manufacturing tolerances of the first fibre composite component part in the area of the assembly surface 2 can be completely compensated by means of the method according to the invention.

It is thus conceivable by way of example to manufacture the first fibre composite component part 1, representing in the embodiment described a CFP fuselage cell skin (CFP skin shell), on a so-called "female" moulding tool by placing a hardenable prepreg material in layers on the inside so that an external surface of the shell-like CFP fuselage cell skin as a result of the defined contact at the moulding tool does indeed have a sufficiently high dimensional accuracy which can also be reproduced adequately in the industrial manufacturing process, but the interior surface in the area of the assembly surface is subject however to considerable height and thickness deviations from an ideal surface geometry (for example a geometrically perfect cylinder jacket interior surface) inherent in production but which can however be compensated practically entirely by means of the method according to the invention so that in particular bolted connections and/or rivet connections and/or adhesive connections become possible between the two fibre composite component parts 1, 2. Thus the second fibre composite component part 3 which in the embodiment here is a CFP ring frame segment, can be joined to the CFP fuselage cell skin in ideal fashion.

A production device for carrying out the method according to the invention has at least one suitable, in particular sufficiently precise and rapid, measuring device 4 as well as a modelling device 5 for rapid generation of the tooling insert 7. Furthermore the production device has a device for the conventional RTM production process with an at least two part moulding tool 10 as well as an extensive control and regulating unit (not shown) for controlling the method which preferably proceeds fully automatically on an industrial scale.

REFERENCE NUMERALS

1 First fibre composite component part
2 Assembly surface
3 Second fibre composite component part
4 Measuring device
5 Modelling device
6 Date line
7 Tooling insert
8 Tooling insert surface
9 Contact surface (second fibre composite component part)
10 Moulding tool (RTM process)
11 Upper tool
12 Lower tool

The invention claimed is:

1. Method for tolerance compensation between two fibre composite component parts for aircraft, comprising the steps:
   a) manufacturing the first fibre composite component part wherein an assembly surface can have tolerance deviations,
   b) manufacturing a tooling insert from a surface geometry of the assembly surface
   c) manufacturing the second fibre composite component part by means of the tooling insert wherein a surface geometry of a contact surface of the second fibre composite component part corresponds substantially with the surface geometry of the assembly surface, and
   d) joining the first fibre composite component part to the second fibre composite component part in the area of the assembly surface and contact surface.

2. Method according to claim 1 characterised in that the assembly surface is scanned by means of a measuring device for determining measured data of the surface geometry of the assembly surface and the tooling insert is made using the measured data.

3. Method according to claim 2 characterised in that the manufacturing of the tooling insert is carried out using the measured data in a modelling device by a metal alloy, a ceramic compound, a plastics material, or any combination thereof.

4. Method according to claim 3 characterised in that the modelling device comprises a rapid prototyping device.

5. Method according to claim 2 characterised in that the scanning of the assembly surface is carried out mechanically or contactlessly.

6. Method according to claim 1 characterised in that the manufacture of the tooling insert is carried out using a cast obtained by a casting mass from the assembly surface.

7. Method according to claim 1 characterised in that the manufacturing of the second fibre composite component part is carried out with the tooling insert in a closed moulding tool.

8. Method according to claim 7 characterised in that to manufacture the second fibre composite component part at least one elastic element is placed in the closed moulding tool to maintain a constant fibre volume proportion.

9. Method according to claim 1 characterised in that the fibre composite component parts are formed with a fibre-reinforced thermosetting plastics material.

10. Method according to claim 9 characterised in that the fibre-reinforced thermosetting plastics material comprises a carbon fibre reinforced epoxy resin.

\* \* \* \* \*